United States Patent [19]

Sakagami et al.

[11] Patent Number: 4,704,006

[45] Date of Patent: * Nov. 3, 1987

[54] HALOGEN-CONTAINING RESIN LENS MATERIAL

[75] Inventors: Teruo Sakagami; Yasufumi Fujii; Naohiro Murayama, all of Iwaki, Japan

[73] Assignee: Kureha Kagaku Kogyo Kabushiki Kaisha, Tokyo, Japan

[*] Notice: The portion of the term of this patent subsequent to Mar. 25, 2003 has been disclaimed.

[21] Appl. No.: 823,832

[22] Filed: Jan. 29, 1986

Related U.S. Application Data

[62] Division of Ser. No. 651,035, Sep. 14, 1984, abandoned.

[30] Foreign Application Priority Data

| Sep. 24, 1983 | [JP] | Japan | 58-176691 |
| Dec. 10, 1983 | [JP] | Japan | 58-233443 |
| May 21, 1984 | [JP] | Japan | 59-100627 |

[51] Int. Cl.$^4$ .................. G02B 1/04; C08F 220/30
[52] U.S. Cl. ................ 350/409; 526/292.3; 526/296
[58] Field of Search .............. 350/409; 526/296, 292.3

[56] References Cited

U.S. PATENT DOCUMENTS

| 3,277,053 | 10/1966 | Hill | 526/292.3 |
| 4,578,445 | 3/1986 | Sakagami | 11/292.3 |

FOREIGN PATENT DOCUMENTS

| 69788 | 7/1974 | Japan | 526/292.3 |
| 21082 | 3/1975 | Japan | 526/292.3 |
| 18602 | 2/1983 | Japan | 526/292.3 |
| 96614 | 6/1983 | Japan | 526/292.3 |

OTHER PUBLICATIONS

Chem Abst, 97, 110992,k.
Chem Abst, 98, 17713,f.
Chem Abst, 99, 196251,u.
Chem Abst, 100, 104689,f.

*Primary Examiner*—Christopher Henderson
*Attorney, Agent, or Firm*—Wenderoth, Lind & Ponack

[57] ABSTRACT

A halogen-containing resin lens material, having a refractive index of $n_D = 1.55$ or higher, an Abbe number of 27 or higher and good dyeable property and comprising a copolymer containing 10 to 90 wt. % of a monomer (I) represented by the formula (I) shown below:

$$O\!\!-\!\!\left(\!CH_2\!-\!\!\underset{\underset{\displaystyle X^1_p}{\displaystyle \bigcirc}}{CH}\!-\!O\right)_{\!\!n}\!\!\overset{R^1}{\underset{\underset{\displaystyle O}{\|}}{C}}\!-\!\overset{R^1}{\underset{\displaystyle |}{C}}\!=\!CH_2 \quad (I)$$

wherein: $R^1$ represents hydrogen or $CH_3$ group; $X^1$ a halogen atom except for fluorin; and p the number of substituted halogens which is an integer selected from 1 to 5, and n is an integer selected from 1 to 4, $R^1$ existing in plural number and being either identical or different, $X^1$ when existing in plural number being either identical or different and 10 to 70 wt. % of a crosslinking monomer having two or more polymerizable functional groups (the percentages being based on the copolymer weight).

6 Claims, No Drawings

HALOGEN-CONTAINING RESIN LENS MATERIAL

This application is a division of now abandoned application Ser. No. 651,035, filed Sept. 14, 1984.

BACKGROUND OF THE INVENTION

This invention relates to halogen-containing resin lens materials, more particularly to a halogen-containing resin lens material having high refractive index and low dispersion.

In the prior art, various inorganic glass lenses have been employed for optical instruments. In recent years, however, synthetic resin lenses are beginning to be widely used together with inorganic glass lenses for their light weight, workability, dyeing property, adaptability to quantity production, and possibility of low cost.

Among the various physical properties required of a lens, a high refractive index and a low dispersion are very important. Possession of a high refractive index not only makes the lens system constituting an important part in optical instruments such as microscope, camera, telescope, etc., or in spectacle lens compact and light in weight, but also has the advantage of reducing spherical aberrations etc. On the other hand, low dispersion is very important as a matter of course for reducing chromatic aberration. A characteristic which is difficult to realize in an inorganic glass lens is the property of being dyeable with dyes of various colors, and this property is an indispensable property of a synthetic resin lens. In particular, it is most preferable that the lens can be dyed as such to a desired color.

However, even in synthetic resin lenses in general, lenses with higher refractive index tend to have higher dispersion, while those with lower refractive index tend to have lower dispersion, similarly as in the case of inorganic glasses. For example, a currently available lens material most popularly used for organic lenses for spectacles in diethylene glycol bisallylcarbonate (hereinafter referred to as CR-39). Although CR-39 has a high Abbe number of $\nu=60$ (i.e., low dispersion), its refractive index is very low, being $n_D^{20}=1.50$. Polymethyl methacrylate, which is sometimes used as lens material, also has a high Abbe number of $\nu=60$ similarly as CR-39, but its refractive index is as low as $n_D=1.49$. Polystyrene ($n_D=1.59$, $\nu=30.4$) and polycarbonate ($n_D=1.59$, $\nu=29.5$), which are said to have a relatively high refractive index and a low dispersion, have been pointed out to be deficient in other physical properties required for a lens material such as surface hardness, solvent resistance and dyeability property. Polynaphthyl methacrylate ($n_D=1.64$) and Polyvinyl naphthalene ($n_D=1.68$) having high refractive index have low Abbe numbers of $\nu=24$ and $\nu=20$, respectively. Thus, many problems accompany all of these materials.

Recently, it has been proposed to use a halogen-substituted phenyl ester of methacrylic acid or a halogen-substituted bisphenol-A derivative for a plastic lens material in order to obtain a high refractive index, as disclosed in Japanese Laid-open Patent Publication Nos. 15118/1980, 13747/1980, 28117/1983 and 54901/1982. However, the copolymers disclosed in these Publications are characterized by having high refractive indices, but nothing is said about dyeability property and Abbe number. As for dyeability property, CR-39 has good dyeable property but has low refractive index as described above. Generally speaking, for enhancement of refractive index, compounds having aromatic groups such as phenyl group, naphthyl group, etc. or compounds having halogenic groups are used. Unfortunately, however, these groups are strongly hydrophobic and generally tend to lower the dyeability property.

Thus, there has been a demand for a plastic lens material having a high refractive index, low dispersion, dyeability property, solvent resistance, and other desirable characteristics.

SUMMARY OF THE INVENTION

An object of the present invention is to meet the above demand. This invention accomplishes this object by the use of a specific copolymer.

More specifically, the synthetic resin lens material according to the present invention is a halogen-containing resin lens material comprising a copolymer containing 10 to 90 wt.% of a monomer (I) represented by the formula (I) shown below and 10 to 70 wt.% of a crosslinking monomer having at least two polymerizable functional groups (% being based on the copolymer weight) copolymerizable therewith:

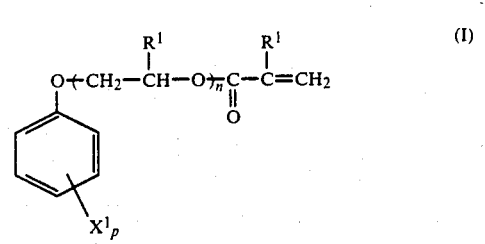

wherein $R^1$ represents hydrogen or $CH_3$ group, $X^1$ a halogen atom except for fluorine, p the number of halogens which is an integer selected from 1 to 5, n is an integer selected from 1 to 4, $R^1$ existing in plural number and being either identical or different, and $X^1$ when existing in plural number being either identical or different.

The copolymer of the present invention, because it contains the monomer (I) and the crosslinking monomer, can provide a lens material having good dyeability property, with a good balance between high refractive index ($n_D^{20}=1.55$ or higher) and low dispersion ($\nu=27$ or higher), and moreover having excellent surface hardness and solvent resistance.

Furthermore, since the monomer is liquid at room temperature, it has a very excellent advantage in handling in that it can be readily polymerized by way of cast polymerization even when the crosslinking agent to be admixed and copolymerized therewith is solid. Further, because of its easily dyeable property inherent in the monomer (I), the dyeability property can be imparted even at a low level of the monomer (I) to the lens obtained from the copolymer of the monomer (I).

Particularly, a lens material with a high refractive index and a low dispersion can be obtained when the copolymer contains 20 to 70 wt.% of the monomer (I) and 20 to 70 wt.% of a crosslinking monomer which is a monomer (II) represented by the formula (II) shown below, the total amount of monomers being 70 wt.% or more:

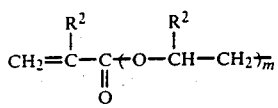

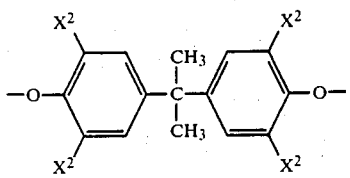

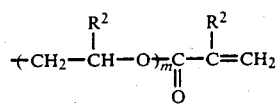

wherein: $R^2$ is hydrogen or $CH_3$ group; $X^2$ is a halogen atom except for fluorine; and m is an integer selected from 0 to 4, $R^2$, $X^2$ and m when existing in plural number being either identical or different, or when the copolymer contains 50 wt.% or more of the monomer (I) and 10 to 40 wt.% of the crosslinking monomer.

DETAILED DESCRIPTION OF THE INVENTION

Copolymer

Monomer (I)

The monomer (I) which constitutes an important component of the copolymer is a monomer represented by the above formula (I).

The halogen atom $X^1$ may generally be chlorine, bromine or iodine, but chlorine or bromine is more preferable in the sense that the copolymer formed has higher refractive index and is more stable with elapse of time. As the number n is increased, the dyeability property with various kinds of dyes, which is one of the specific feature of the copolymer of the present invention, tends to become better. However, when n is 5 or higher, the copolymer formed tends to have poorer surface hardness and lower refractive index. Therefore, in the present invention, an integer n selected from 1 to 4 is employed. The monomer (I) can be a mixture of monomers with different numbers of n, provided that each of n's is within the range of from 1 to 4. The value of p has the greatest effect on the refractive index. By varying this value from 1 to 5, it is possible to design a lens with a refractive index suited for the purpose.

Examples of the monomer represented by the formula (I) include (meth)acryloxyethoxydibromobenzene, (meth)acryloxyethoxy-2,4,6-tribromobenzene, (meth)acryloxypropoxy-2,4,6-tribromobenzene, (meth)acryloxydiethoxy-2,4,6-tribromobenzene, (meth)acryloxyethoxy-4-bromobenzene, (meth)acryloxyethoxytrichlorobenzene, (meth)acryloxyethoxypentabromobenzene, and mixtures thereof. Here, "(meth)acryloxy" is meant to include both of the groups or structures derived from acrylic acid and methacrylic acid.

To the best of our knowledge, there has been known no example in which a copolymer contains such a monomer (I) as one component for the lens material.

Since the monomer (I) is itself capable of forming a homopolymer having a high refractive index and a low dispersion, and therefore a copolymer with a high refractive index and a low dispersion can be obtained with ease by the use of a high level of this monomer. Also, even if the proportion of the monomer (I) in the copolymer is relatively smaller, there is the advantage of providing a copolymer having the necessary dyeability property for lens, and it is possible to obtain a copolymer with a refractive index $n_D^{20} = 1.55$ or higher and an Abbe number $\nu = 27$ or higher. On the other hand, a homopolymer consisting of only this monomer (I) is not suitable for lens material. This monomer alone has poor polymerizability, and sufficient polymerization conversion cannot be attained. The polymer obtained is relatively easily attacked by an organic solvent with no solvent resistance. The monomer (I) generally has a color from colorless to brown, and the degree of coloration depends very much on the method for purification of the monomer. Accordingly, when sufficient purification cannot be conducted, a polymer containing a very large amount of the monomer (I) also maintains the color inherent in the monomer and may sometimes be unsuitable for the lens material depending on the extent of purification.

When the proportion of the monomer component (I) is too small in the copolymer, the copolymer naturally will not have the characteristics of refractive index, the Abbe number, and dyeability property as described above. Thus, it is necessary that the monomer represented by the formula (I) should be comprised in the copolymer in an amount of 10 to 90 wt.%, preferably 20 to 80 wt.%, more preferably 30 to 70 wt.%.

CROSSLINKING MONOMER

In the present invention, for the purpose of increasing the solvent resistance, heat resistance, etc. of the homopolymer of the monomer of the above formula (I), a three-dimensional crosslinked structure is formed by introducing 10 to 70 wt.% of a crosslinking monomer which has two or more polymerizable functional groups and is copolymerizable with the monomer (I).

Examples of such a crosslinking monomer having two or more polymerizable functional groups copolymerizable with the monomer (I) are: divinyl compounds, typically divinylbenzene; allyl compounds such as allyl cinnamate, allyl(meth)acrylate, diethylene glycol bisallyl carbonate, triallylcyanurate, etc.; and acrylic acid or methacrylic acid esters of polyhydric alcohols. The esters of polyhydric alcohols with acrylic acid or methacrylic acid are exemplified by ethylene glycol di(meth)acrylate, poly(di, tri, etc.)ethylene glycol di(meth)acrylate, 1,3-butylene di(meth)acrylate, 1,6-hexandiol di(meth)acrylate, neopentylglycol di(meth)acrylate, polypropyleneglycol di(meth)acrylate, bis[(meth)acryloxyethyl]tetrabromophthalate, 2-hydroxy-1,3-dimethacryloxypropane, 2,2-bis[4-(meth)acryloxy(mono- or poly-)ethoxyphenyl]propane, and 2,2-bis[4-(meth)acryloxy(mono- or poly-)propoxyphenyl]propane. In addition, monomers (II) represented by the formula shown below can also be used.

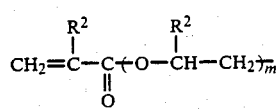

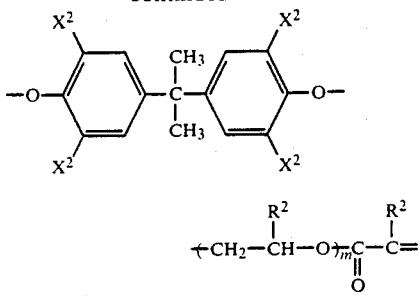

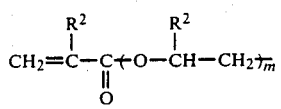

wherein all the symbols are the same as defined above.

Of these crosslinking monomers, it is preferred to use a divinyl compound, 2,2-bis[4-(meth)acryloxy(mono- or poly-)ethoxyphenyl]propane, 2,2-bis[4-(meth)acryloxy(mono- or polyethoxy-)phenyl]propane, ethylene or polyethylene (di, tri, etc.,) glycol di(meth)acrylate, or bis(meth)acryloxyethyltetrabromophthalate, but the monomer (II) is preferably used when the content of the monomer (I) is less as described hereinafter.

OPTIONAL COMONOMER

The copolymer according to the present invention comprises the two kinds of monomers as principal ingredients, but the copolymer may also contain an ethylenically unsaturated monomer (not limited to monoethylenically unsaturated monomer) copolymerized therein, provided that the objects of the present invention can be achieved. The amount of the optional comonomer is desirably about 0 to 80 wt.%, preferably 0 to 40 wt.%, of the present copolymer. Such a monomer is preferably one in which the homopolymer itself can produce a transparent polymer with great refractive index or Abbe number. Specifically, for example, various alkyl(meth)acrylates such as methyl(meth)acrylate, ethyl(meth)acrylate, n-butyl(meth)acrylate, iso-butyl(meth)acrylate, naphthyl methacrylate; halo-containing phenyl(meth)acrylate such as chlorophenyl(meth)acrylate, bromophenyl(meth)acrylate, iodophenyl(meth)acrylate, trichlorophenyl(meth)acrylate, tribromophenyl(meth)acrylate, triiodophenyl(meth)acrylate; and aromatic compound such as styrene, vinyl naphthalene, α-methyl styrene, vinyl naphthalene, and vinyl carbazole and preferable.

In particular, when styrene is employed, even when the monomer (I) is employed in a large amount, there is an advantage in that the coloration due to the monomer (I) disappears and a colorless copolymer can be obtained. With addition of other monomers, no such effect whatsoever can be obtained. The reason why coloration in the copolymer disappears with addition of styrene as one component in the copolymer has not yet been clarified at the present stage, but this discovery may be considered to be very useful.

When the degree of purification of the monomer (I) is high enough to be colorless, no styrene is required, of course.

PREFERRED EMBODIMENT

In the present invention, an even better lens material can be obtained by the use of 10 to 90 wt.% of the monomer (I) and 10 to 70 wt.% of the crosslinking monomer having two or more polymerizable functional groups copolymerizable therewith.

In particular, when, of the above-mentioned crosslinking monomers, the monomer (II), which is 2,2-bis-4-(meth)acryloxy(mono- or poly-)ethoxydihalogenophenylpropane, represented by the formula (II), is used in a specific proportion, an excellent copolymer of very high refractive index ($n_D^{20}$=1.56 or higher) and low dispersion ($\nu$=30 or higher) can be obtained:

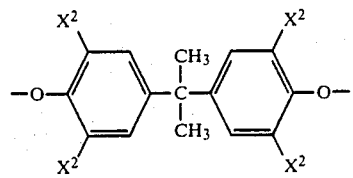

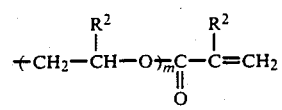

wherein all the symbols have the same meanings as defined above.

In the monomer (II), the halogen atom ($X^2$) is generally chlorine, bromine or iodine, but more preferably chlorine or bromine in the sense that the copolymer formed has a higher refractive index and is more stable with lapse of time. The number m has a significant meaning with regard to the lens characteristics of the copolymer formed. When m is 5 or higher, the copolymer formed tends to have lower surface hardness and lower refractive index. Therefore, in the present invention, an integer selected from 0 to 4 is employed. Each of $R^2$, m and $X^2$ can, when it is present in the formula in plural, be the same or different.

In this case, it is preferable that the monomer (I) content be 20 to 70 wt.% in the copolymer, and the monomer (II) content be 20 to 70 wt.%, the sum of the contents of both monomers being 70 wt.% or more. Of course, the crosslinking monomer and the optional comonomer can be employed in combination, but in amounts of not more than 30 wt.%.

If the amount of the monomer (II) is excessive, the system may become too viscous, and difficulties may be encountered in handling of polymerization. Therefore, the content of the monomer (II) should be 20 to 70 wt.%. Also, if the sum of the monomer (I) and the monomer (II) is less than 70 wt.%, the resultant copolymer cannot have a high refractive index and a low dispersion such as $n_D^{20}$=1.56 or higher, $\nu$=30 or higher.

On the other hand, generally speaking, if the amount of the monomer (I) is large, a copolymer with high refractive index and low dispersion can be obtained with ease without the use of a special crosslinking monomer such as the monomer (II). In this case, the monomer (I) is used in excess of 50 wt.% up to 90 wt.%, and the copolymer containing 10 wt.% of the crosslinking monomer as described above can be used. When employing the monomer (I) in a large quantity, coloration may sometimes be caused unless sufficient care is paid to the purification method, but the use of styrene in combination will bring about the advantage of preventing such a coloration.

POLYMERIZATION

Polymerization of the above monomers can proceed with a conventional radical polymerization initiator.

Polymerization system can also be one used conventionally for ordinary radical polymerization. However, since the copolymer formed is crosslinked, the treatment accompanied by melting or dissolution is factually impossible, cast polymerization is generally preferred from the viewpoint for utilization of the copolymer for plastic lens.

Cast polymerization is a known technique. The vessel for cast polymerization may be a mold or framework with the shape of a plate, lens, cylinder, square column, cone, sphere or other shapes designed according to the purpose thereof. Materials for the vessel may be any ones suited for the purpose such as inorganic glass, plastic, metal, etc. Polymerization may be carried out with a mixture of the monomers and a polymerization initiator charged into such a vessel, optionally under heating, if desired. Alternatively, according to another embodiment of the invention, a prepolymer or syrup obtained by carrying out polymerization to some extent in another vessel, may be charged into a polymerization vessel to complete polymerization. The monomers and the polymerization initiator required may be mixed at one time or stepwise. Also, the mixture may also contain auxiliary materials depending on the uses expected such as antistatic agents, colorants, fillers, UV-ray absorbers, heat stabilizers, antioxidants and others.

In still another specific example of the polymerization method of the present invention, a mixture of the monomers and polymerization initiator required or a prepolymer is polymerized while being suspended in water, that is, is subjected to suspension polymerization. This method is suitable for obtaining spherical lens of various particle sizes. Suspension polymerization is also a known technique, and it can be practiced in the present invention according to the knowledge known in the art.

The copolymer obtained of course can be subjected to a post-treatment such as heating for completion of polymerization, which might not have been completed, or increasing of hardness, or annealing for removal of internal strain which may have been caused by cast polymerization.

LENS

The lens obtained from the copolymer of the present invention is substantially the same as the synthetic resin lens of the prior art except that the lens material is a crosslinked polymer comprising a specific monomer of the present invention. Accordingly, a lens having various characteristics inherent in the copolymer of the present invention can be obtained directly by cast polymerization of the present copolymer in the form of a lens or by cutting out from a plate material, such a step being followed optionally by a post-treatment such as surface polishing, antistatic treatment, etc., as necessary. Further, in order to increase the surface hardness, it is possible to cover the surface with an inorganic material by vapor deposition or to apply an organic coating material by dipping.

DYEING

The lens according to the present invention has good dyeability thanks to its content of the monomer (I) as a component. Dyeing may be carried out by dipping the lens in an aqueous solution containing a water-soluble dye with any of various colors at room temperature or under heating. The degree of coloration can be varied by controlling the dye concentration, the temperature or the dipping time.

EXPERIMENTAL EXAMPLES

Throughout these examples, quantities expressed in "parts" or "percent" are by weight.

EXAMPLE 1

A mixture of 60 parts of thoroughly purified 1-acryloxyethoxy-2,4,6-tribromobenzene and 40 parts of 2,2-bis-(4-methacryloxyethoxy-3,5-dibromophenyl)propane was charged together with one part of lauroyl peroxide as the polymerization initiator into a glass vessel. After the vessel was degassed sufficiently and purged with nitrogen, the mixture was heated at 50° C. for one hour, at 60° C. for 15 hours, at 80° C. for 2 hours, and at 110° C. for one hour to complete the polymerization. The copolymer thus prepared was substantially colorless and transparent, entirely insoluble in organic solvents such as acetone, benzene, etc., thus being improved in resistance to organic solvents. The surface hardness was 3H according to the pencil hardness based on the JIS (K5400) and heat resistance was also excellent. When measurement was conducted by means of an Abbe refractometer, the refractory index and the Abbe number were found to be $n_D^{20}=1.605$ and $\nu=33.5$, thus indicating very well balanced values. This copolymer was immersed in an aqueous 0.15% solution of "Sumicalon Blue E-FBL" produced by Sumitomo Kagaku K.K., Japan at 80° C. for 3 minutes. The copolymer was dyed with a brilliant blue color.

EXAMPLE 2

67 Parts of 1-acryloxyethoxy-2,4,6-tribromobenzene (containing diethoxy, triethoxy compounds), 23 parts of styrene and 10 parts of divinylbenzene, together with 1 part of lauroyl peroxide as the polymerization initiator, a UV absorber and an antioxidant, were charged into a glass vessel. After the glass vessel was sufficiently degassed and thoroughly purged with nitrogen, the mixture was heated at 50° C. for one hour, at 60° C. for 15 hours, at 80° C. for 2 hours, and at 110° C. for one hour to complete the polymerization. The copolymer thus obtained was substantially colorless and transparent, and enriched in resistance to organic solvents. It exhibited a pencil hardness of 3H and also had excellent heat resistance. The refractory index and the Abbe number were as follows: $n_D^{20}=1.598$, $\nu=33.5$.

EXAMPLE 3

55 Parts by weight of 1-methacryloxydiethoxy-2,4,6-tribromobenzene, 30 parts of styrene, 15 parts of 2,2-bis(4-methacryloxydiethoxy-3,5-dibromophenyl)propane and one part of lauroyl peroxide as the polymerization initiator were mixed together, and polymerization was carried out under the same conditions as in Example 1. The copolymer obtained was substantially colorless and transparent and was insoluble in organic solvents. It exhibited a pencil hardness of 3H and also had excellent heat resistance. The refractory index and the Abbe number were as follows: $n_D^{20}=1.596$, $\nu=32.2$.

EXAMPLE 4

70 Parts of 1-acryloxyethoxy-2,4,6-tribromobenzene (containing diethoxy, triethoxy compounds), 30 parts of 2,2-bis(4-acryloxydiethoxyphenyl)propane and one part of lauroyl peroxide as the polymerization initiator were mixed together, and polymerization was carried out under the same conditions as in Example 1. The copolymer obtained was substantially colorless and transparent. It exhibited a pencil hardness of 3H and had excellent solvent resistance and heat resistance. The refractory index and the Abbe number were as follows: $n_D^{20} = 1.581$, $\nu = 35.0$.

COMPARATIVE EXAMPLE 1

To 100 parts of thoroughly purified 1-acryloxyethoxy-2,4,6-tribromobenzene (containing diethoxy, triethoxy compounds), one part of lauroyl peroxide as the polymerization initiator was added, and polymerization was carried in the same manner as in Example 1. The polymer thus obtained was of low polymerization degree, and the monomer also remained therein. Also, this polymer exhibited rubbery elasticity and could not be used at all for lens material.

EXAMPLE 5

A mixture was prepared by adding 0.5 part of a UV-ray absorber ("Tinuvin 328", trade name, produced by Ciba Geigy Co.) to 60 parts of 2,2-bis(4-methacryloxyethoxy-3,5-dibromophenyl)propane, 40 parts of 1-acryloxyethoxy-2,4,6-tribromobenzene and one part of lauroyl peroxide as the polymerization initiator.

This mixture was placed into a glass vessel and, after degassing and purging of the vessel with nitrogen, the mixture was heated at 50° C. for one hour, at 60° C. for 15 hours, at 80° C. for 2 hours and at 110° C. for one hour to complete the polymerization.

The copolymer thus prepared was substantially colorless and had a three-dimensionally crosslinked structure, being insoluble in organic solvents such as acetone, benzene, etc. The copolymer had also an excellent surface hardness, exhibiting a pencil hardness of 2H to 3H as measured according to JIS (K-5400). The refractive index and the Abbe number of this copolymer as measured by an Abbe refractometer at 20° C. were found to be as follows. Refractive index: $n_D^{20} = 1.603$. Abbe number: $\nu = 34.1$.

Thus, the copolymer according to this example was excellent optical properties and can provide a very good lens material. When the copolymer was dyed under the same conditions as in Example 1, the copolymer was dyed a brilliant blue.

EXAMPLE 6

To a mixture of 40 parts of 2,2-bis(4-methacryloxyethoxy-3,5-dibromophenyl)propane, 40 parts of 1-acryloxydiethoxy-2,4,6-tribromobenzene (containing diethoxy, triethoxy compounds) and 20 parts of isobutyl methacrylate, one part as the total amount of 0.5 part of a UV absorber (Tinuvin 328, trade name, produced by Ciba-Geigy Co.) and 0.5 part of an antioxidant ("Irganox 245", trade name, produced by Ciba-Geigy Co.) was added, and one part of lauroyl peroxide was added thereto. Polymerization was carried out according to the procedure in Example 1 to obtain a copolymer.

The copolymer thus prepared was substantially colorless and had excellent solvent resistance. It had a pencil hardness of 2H. The refractory index and the Abbe number at 20° C. were as follows. Refractive index: $n_D^{20} = 1.57$. Abbe number: $\nu = 37.7$.

EXAMPLE 7

A mixture of 30 parts of methacryloxypolyethoxy-2,4,6-tribromobenzene (mixture of compounds of degree of ethoxylation, n, of 1, 2, 3 and 4; average n=2.2), 40 parts of 2,4,6-tribromophenyl methacrylate, 20 parts of styrene and 10 parts of ethylene glycol dimethacrylate was subjected to mass polymerization with the use of lauroyl peroxide as the polymerization initiator. The polymerization conditions were 60° C./16 hours, 80° C./1 hour, 100° C./1 hour and 110° C./1 hour.

The resultant copolymer was transparent and was suitable as a lens material. The copolymer had a refractive index and an Abbe number as shown. Refractive index: $n_D^{20} = 1.597$. Abbe number: $\nu = 32.5$ This copolymer was immersed in an aqueous 0.15% solution of "Sumicalon Blue E-FBL" produced by Sumitomo Kagaku K.K. at 80° C. for 5 minutes. The copolymer was dyed in brilliant blue color.

COMPARATIVE EXAMPLE 2

70 parts of 2,4,6-tribromophenyl methacrylate, 20 parts of styrene and 10 parts of ethylene glycol dimethacrylate were copolymerized similarly as in Example 7 to obtain a copolymer free of methacryloxypolyethoxy-2,4,6-tribromobenzene used in Example 7.

When this copolymer was immersed in the same aqueous solution of "Sumicalon Blue E-FBL" as used in Example 1 at 80° C. for 15 minutes, the copolymer was not dyed at all.

EXAMPLE 8

A mixture of 25 parts of methacryloxypolyethoxy-2,4,6-tribromobenzene used in Example 7, 65 parts of 2,4,6-tribromophenyl methacrylate and 10 parts of ethylene glycol dimethacrylate was subjected to mass polymerization with the use of 0.6 part of lauroyl peroxide under the polymerization conditions of 60° C./16 hours, 80° C./1 hour, 100° C./1 hour and 110° C./1 hour.

A colorless, transparent and beautiful copolymer was obtained. This material had the following optical properties. Refractive index: $n_D^2 = 1.609$. Abbe number: $\nu = 32.2$.

This copolymer was immersed in the same aqueous solution of "Sumicalon Blue E-FBL" as used in Example 1 at 80° C. for 5 minutes. The copolymer was dyed a brilliant blue color.

COMPARATIVE EXAMPLE 3

Mass polymerization of 5 parts of methacryloxypolyethoxy-2,4,6-tribromobenzene used in Example 7, 20 parts of styrene, 65 parts of 2,4,6-tribromophenyl methacrylate was conducted similarly as in Example 7. When this copolymer was immersed in the same aqueous solution of "Sumicalon Blue E-FBL" as used in Example 1 for 15 minutes, the copolymer was not dyed at all.

EXAMPLES 9-14

Each of the monomer compositions shown in Table 1 was charged together with lauroyl peroxide into a glass vessel, and polymerization was completed according to the procedure in Example 1.

The respective copolymers had the refractive indices and Abbe numbers which are summarized in Table 1. Each copolymer indicates a high refractive index and a high Abbe number.

The copolymers of Examples 9 through 14 have all shown excellent dyeability properties.

TABLE 1

| Example No. | Monomer Composition (parts) | $n_D^{20}$ | $\nu$ |
|---|---|---|---|
| 9 | Methacryloxydiethoxy-2,4,6-tribromobenzene (50), 2,2-bis[(4-methacryloxyethoxy-3,5-dibromo)phenyl]propane (40), Tribromophenyl methacrylate (10) | 1.609 | 33.4 |
| 10 | Methacryloxydiethoxy-2,4,6-tribromobenzene (80), Ethylene glycol dimethacrylate (10), Styrene (10) | 1.592 | 35.3 |
| 11 | Methacryloxydiethoxy-2,4,6-tribromobenzene (50), Bis(methacryloxyethyltetrabromophthalate (50) | 1.626 | 30.8 |
| 12 | Acryloxydiethoxy-2,4,6-tribromobenzene (50), 2,2-bis[(4-methacryloxyethoxy-3,5-dibromo)phenyl]propane (50) | 1.606 | 33.4 |
| 13 | Methacryloxypropoxy-2,4,6-tribromobenzene (50), 2,2-bis[(4-methacryloxyethoxy-3,5-dibromo)phenyl]propane (40), Tribromophenyl methacrylate (10) | 1.612 | 32.0 |
| 14 | Methacryloxydiethoxy-2,4,6-tribromobenzene (10), Methacryloxypropoxy-2,4,6-tribromobenzene (50), 2,2-bis[(4-methacryloxyethoxy-3,5-dibromo)phenyl]propane (40) | 1.605 | 33.4 |

Amount of lauroyl peroxide employed: 0.5 part per 100 parts of the monomer in Examples 9 and 10 and 1.0 part in Examples 11 to 14.

What is claimed is:

1. A lens having a refractive index of $n_D^{20}=1.55$ or higher, an Abbe number of 27 or higher, and good dyeability property, which lens is made of a copolymer containing 20 to 70 wt.% of a monomer (I) represented by the formula (I) shown below:

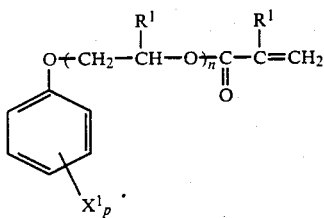
(I)

wherein: $R^1$ represents hydrogen or $CH_3$ groups; $X^1$ represents a halogen atom except for fluorine; and p represents the number of halogens, which is an integer selected from 1 to 5, n is an integer selected from 1 to 4, $R^1$ existing in plural number being either identical or different and $X^1$ when existing in plural number being either identical or different and 20 to 70 wt.% of a crosslinking monomer having at least two polymerizable functional groups which is a monomer (II) represented by the formula (II) shown below, the total amount of monomers (I) and (II) being above 70 wt.%:

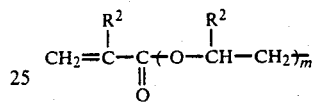
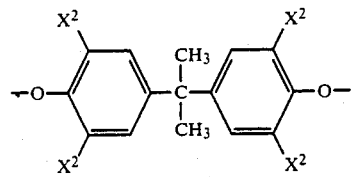
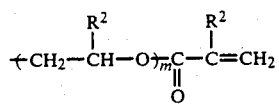
(II)

wherein: $R^2$ is hydrogen or $CH_3$ group; $X^2$ is a halogen atom except for fluorine; and m is an integer selected from 0 to 4, $R^2$, $X^2$ and m when existing in plural number being either identical or different, (each percentage above being based on the copolymer weight).

2. The lens according to claim 1, wherein the copolymer comprises the monomer (I) in an amount of more than 50 wt.%, 20 to 40 wt.% of the crosslinking monomer having at least two polymerizable functional groups copolymerizable therewith and 0 to 40 wt.% of styrene as the primary monomeric components.

3. The lens according to claim 1, wherein the monomer (I) is a mixture of monomers with a different number of n.

4. The lens according to claim 1, wherein the monomer (II) is a mixture of monomers with a different number of m.

5. The lens according to claim 1 which is dyed.

6. The lens according to claim 5 which is dyed with an aqueous dye.

* * * * *